(12) United States Patent
Liebler et al.

(10) Patent No.: US 6,232,754 B1
(45) Date of Patent: *May 15, 2001

(54) SLEEP-MODE-READY SWITCHING POWER CONVERTER

(75) Inventors: Jerome Edgar Liebler, North Plains, OR (US); Alma Stephenson Anderson, Rio Rancho, NM (US)

(73) Assignee: Philips Electronics North America Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/383,290

(22) Filed: Aug. 15, 1999

(51) Int. Cl.$^7$ ........................................ G05F 1/40
(52) U.S. Cl. ................................. 323/272; 323/282
(58) Field of Search ...................... 323/272, 282, 323/271

(56) References Cited

U.S. PATENT DOCUMENTS

| | | | |
|---|---|---|---|
| 4,816,978 | * 3/1989 | Domenget et al. | 363/21 |
| 5,045,712 | 9/1991 | Baggenstoss | 307/29 |
| 5,532,914 | 7/1996 | Kageyama et al. | 363/50 |
| 5,731,694 | 3/1998 | Wilcox et al. | 323/287 |
| 5,796,595 | 8/1998 | Cross | 363/16 |
| 5,920,475 | 7/1999 | Boylan et al. | 363/127 |
| 6,023,154 | * 2/2000 | Martinez | 323/272 |

FOREIGN PATENT DOCUMENTS

| | | |
|---|---|---|
| 1110022 | 4/1989 | (JP). |
| 07327366A | 12/1995 | (JP). |
| 10201090A | 7/1998 | (JP). |

OTHER PUBLICATIONS

Investigation of Candidate VRM Topologies for Future Microprocessors X. Xhou et al, Anaheim, Ca, Feb. 15–19, 1998 New York, NY.

* cited by examiner

Primary Examiner—Shawn Riley
(74) Attorney, Agent, or Firm—Steven R. Biren

(57) ABSTRACT

In a power converter for supplying a controlled output from an input supply, a plurality of transfer devices is used to selectively couple the input supply to a distribution of storage devices. In a high-current mode, each of the transfer devices and associated storage device is used to couple the input supply to the controlled output. In a minimal-current mode, each of the transfer devices and associated storage device is selectively disabled until only one transfer device and storage device is utilized, and this remaining device may also be selectively disabled. Because the storage devices are distributed, each storage device can be smaller than that required for the high-current operation, thereby minimizing the losses associated with high-current switching converters during low-current operation. In another aspect of this invention, the plurality of transfer devices is operated at different phases to one another, thereby reducing the ripple associated with high-current operation. In another aspect of this invention, the storage devices are each sized for efficient operation at a given load level.

19 Claims, 4 Drawing Sheets

SLEEP-MODE-READY SWITCHING POWER CONVERTER

BACKGROUND OF THE INVENTION

1. Field of the Invention

This invention relates to the field of electronic devices, and in particular to switching power-supply converters and regulators.

2. Description of Related Art

Switching converters and regulators are common in the art. Commonly, the terms voltage converter, voltage regulator, DC—DC converters, DC supplies, and so on are used to generically define a device that provides a source of voltage or current that satisfies a given constraint (hereinafter a "controlled" voltage or current source) from an input supply that may or may not satisfy that constraint (hereinafter an "uncontrolled" voltage or current source). The term switching converter, or switching power converter, is used herein for ease of reference; it will be recognized by one of ordinary skill in the art that the principles involved are applicable to devices that provide a controlled voltage, a controlled current, or a combination of both. Generally, a switching converter switches between coupling and decoupling an input supply to a storage device, and the load draws its energy from the storage device. The storage device may store voltage or current, or a combination of both. Controlling the amount of time that the input supply is coupled to the storage device controls the amount of power transferred from the input supply to the load. The particular devices employed determine whether the controlled amount of power is transferred as controlled voltage or controlled current, or a combination of both.

FIG. 1 illustrates an example block diagram of a commonly used switching power converter 100. The example power converter 100 is commonly termed a "buck converter" or "buck regulator", and, in particular, a "two-switch buck converter". Other switching converters are common in the art, the buck converter being selected herein as a preferred paradigm for presenting the principles of switching supplies and the principles of this invention. The switching power converter 100 comprises a first switch S1 110, a second switch S2 120, two storage devices L 130 and C 140, and a switch controller 150 that controls the power transfer from a supply input $V_{IN}$ 101 to a controlled output $V_{OUT}$ 103, via the storage devices L 130 and C 140. The supply input $V_{IN}$ 101 and controlled output $V_{OUT}$ 103 are referenced to a second voltage supply 109, typically at ground potential. For ease of understanding, the operation of the switching converters herein is described in terms of a controlled voltage output.

Initially, the switch controller 150 closes switch S1 110, thereby coupling the supply input $V_{IN}$ 101 to the storage devices L 130 and C 140. Because the storage device L 130 is an inductor, the current $I_L$ 131 rises continuously from its initial zero level, ideally linearly. This current provides an output current $I_{OUT}$ 103' to a load (not shown), and also transfers charge to the capacitor C 140, increasing the voltage $V_{OUT}$ 103 across the capacitor relative to the second supply voltage 109. The rate of increase in the current $I_L$ 131 is, ideally, linear, and proportional to the voltage across the inductor. Initially, with switch S1 closed, the voltage at node 102 is equal to the input supply voltage, and $V_{OUT}$ 103 is zero. Therefore, initially, the rate of increase in current $I_L$ 131 is large.

Typically, the switch controller 150 is operated continuously at a fixed frequency of operation, based upon which the values of the storage devices L 130 and C 140 are determined. The proportion of time that switch S1 is on (the "duty cycle") is used to control the output $V_{OUT}$ 103. Ideally, the duty cycle is initially long, to supply sufficient energy to bring the controlled output to its desired value quickly, and then settles to a steady-state value that is related to the ratio of the controlled output $V_{OUT}$ 103 to the supply voltage $V_{IN}$ 101. The example buck converter of FIG. 1 is a "down" converter, such that the desired value of $V_{OUT}$ 103 is less than the supply voltage $V_{IN}$ 101; switching "up" converters are also common in the art.

At a later point in time, dependent upon the current duty cycle, the switch controller 150 opens the switch S1 110, decoupling the supply input $V_{IN}$ 101 from the storage devices L 130 and C 140. At the same time, S2 is closed, allowing the current $I_L$ 131 to continue to flow, due to the inductance of the inductor L 130, thereby transferring energy from the first storage device L 130 to the second storage device C 150, and correspondingly, to the controlled output $V_{OUT}$ 103.

At the beginning of the next cycle, the controller 150 closes the switch S1 110 and opens the switch S2 120, coupling the input supply 101 again to the storage devices L 130 and C 140. At this time, $V_{OUT}$ 103 is greater than zero, and therefore the rate of increase in current $I_L$ 131 is less than at the start of the initial cycle, when $V_{OUT}$ 103 was zero. Thereafter, switch S1 is opened, switch S2 is closed, and current $I_L$ 131 decreases. The rate of decrease of current $I_L$ 131 is proportional to the voltage across the inductor L 130, which, while S2 is closed and S1 is opened, is equal to the voltage $V_{OUT}$ 103. Thereafter, switch S1 is again closed, switch S2 opened, and the cycles continue. The switch controller 150 continually adjusts the duty cycle until the voltage $V_{OUT}$ 103 reaches the desired controlled voltage level.

The rate of increase in $V_{OUT}$ 103 is proportional to the difference between the current $I_L$ 131 and the current $I_{OUT}$ 103' drawn by the load. In a steady-state condition, with $V_{OUT}$ 103 at the desired controlled voltage level, the average current $I_L$ 131 is equal to the average load current $I_{OUT}$ 103'. During each cycle, the current increases (S1-on) and decreases (S1-off) about this average load current value. This variance about the average is termed a ripple.

When the current demand decreases, as when the load is placed in a minimal current sleep-mode, the controlled output $V_{OUT}$ increases, as the switching converter continues, at least momentarily, to supply the higher current. In response to the overvoltage, the controller 150 decreases the duty cycle of switch S1. The duty cycle is reduced such that the duration of current increase (S1-on) is substantially less than the duration of current decrease (S1-off), and the current $I_L$ 131 through the inductor L 130 decreases below zero as charge is removed from the capacitor C 140. Thus, with each subsequent cycle, the average current $I_L$ 131 decreases, and the amount of overvoltage decreases. Eventually, the average current $I_L$ 131 decreases to the reduced current demand of the sleep-mode load 103', and the controller continues its steady state process of periodically closing the switch S1 to maintain the controlled voltage output $V_{OUT}$ 103.

In both the high-current and low-current demand scenarios, the controller 150 controls the switch S1 so as to periodically replenish the energy removed from the storage devices L 130 and C 140 due to the load current $I_{OUT}$ 103' and due to circuit and switch losses, such as the inherent resistances of the inductor L 130 and switches S1 and S2.

That is, the controller couples and decouples the input supply 101 to the storage devices L 130 and C 140 to control the amount of power that is transferred to the load associated with the controlled outputs 103, 103'. A variety of techniques are commonly employed in the controller to control the switching to provide the controlled output, depending upon the level of precision or accuracy required on the controlled outputs 103, 103'. The controller 150 receives appropriate feedback (not shown) to maintain the required precision or accuracy.

As portable electronic systems become increasingly popular, and increasingly capable, the need for placing segments of the system into a "sleep-mode" that consumes minimal power becomes increasingly important. The devices that provide power to such segments, therefore, must be able to provide high current when the segment is in an operational-mode, and minimal current when the segment is in sleep-mode. The high current requirement introduces a requirement for large capacity storage devices, and in particular, an inductor L 130 having a higher current carrying capability. A larger inductor has an inherently larger resistance to inductance ratio, and incurs relatively larger losses than a smaller inductor. Relative to a large current requirement, the larger loss may be insignificant, but relative to a minimal current, the losses may be significant. In many cases, the energy transfer from the input supply to overcome the losses associated with the converter exceed the energy required to support the sleep-mode requirements. Additionally, a higher current-capable inductor is physically larger and bulkier than a lower current-capable inductor, and is often unsuitable for packaging into a small, portable device.

BRIEF SUMMARY OF THE INVENTION

It is an object of this invention to provide a switching converter that provides for efficient operation for both high-current operational-mode requirements, as well as low-current sleep-mode requirements. It is a further object of this invention to provide a switching converter that is dynamically reconfigurable to provide efficient operation at varying load levels. It is a further object of this invention to provide a switching converter that has reduced ripple effects in a high current mode. It is a further object of this invention to provide a switching converter that contains components that are suitable for packaging into small, portable devices.

These objects and others are achieved using a variety of techniques. In one aspect of this invention, the transfer device used to couple and decouple the input supply to the controlled output can be disabled, preferably while the transferred energy is stored at a peak voltage potential. In an other aspect of this invention, a plurality of transfer devices are used to selectively couple the input supply to a distribution of storage devices. In a high-current mode, each of the transfer devices and associated storage device is used to couple the input supply to the controlled output. In a minimal-current mode, each of the transfer devices and associated storage device is selectively disabled until only one transfer device and storage device is utilized, and this remaining device may also be selectively disabled. Because the storage devices are distributed, each storage device can be smaller than that required for the high-current operation, thereby minimizing the losses associated with high-current switching converters during low-current operation, and thereby reducing the packaging constraints associated with high-current-capable devices. In another aspect of this invention, the plurality of transfer devices are operated at different phases to one another, thereby reducing the ripple associated with high-current operation. In another aspect of this invention, the storage devices are each sized for efficient operation at a given load level.

BRIEF DESCRIPTION OF THE DRAWINGS

The invention is explained in further detail, and by way of example, with reference to the accompanying drawings wherein.

Throughout the drawings, same reference numerals indicate similar or corresponding features or functions.

DETAILED DESCRIPTION OF THE INVENTION

Figure 1:
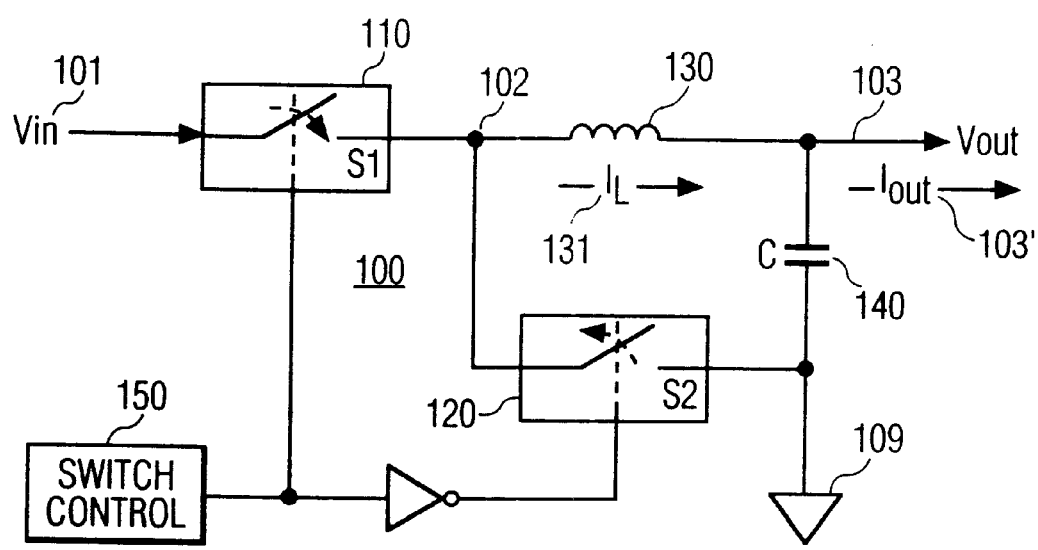
FIG. 1 illustrates an example block diagram of a prior art switching converter.
Figure 2:
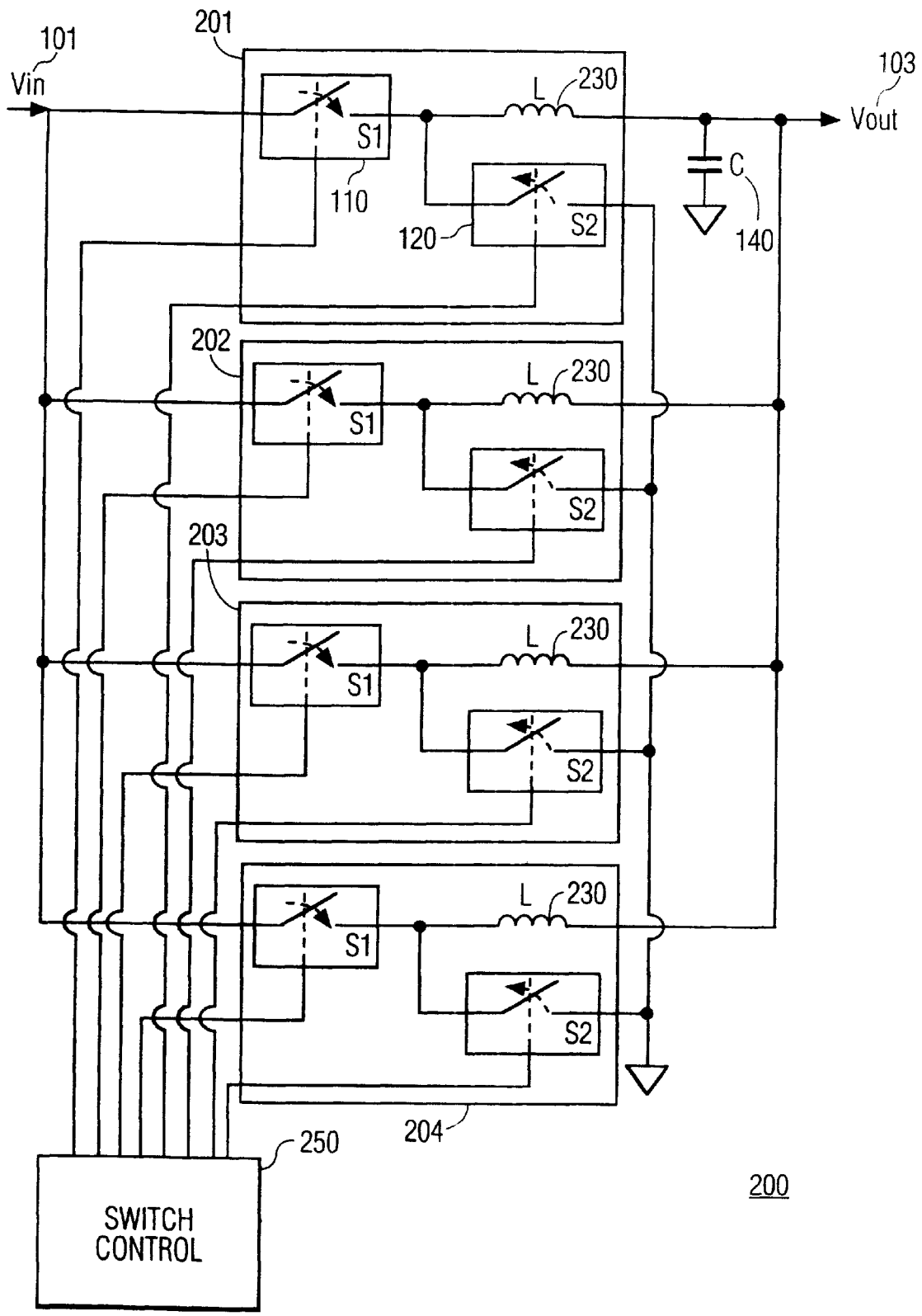
FIG. 2 illustrates an example block diagram of a switching converter with distributed transfer devices and storage devices in accordance with this invention.

FIG. 2 illustrates an example block diagram of a switching converter 200 with distributed transfer devices and storage devices 201–204 in accordance with this invention. This block diagram illustrates a combination of aspects of this invention. As in the example of FIG. 1, a buck converter is presented as a paradigm for the principles of switching converters and the principles of this invention; other switching converter architectures are equally suited to the principles and techniques presented herein.

In accordance with a first aspect of this invention, the controller 250 is configured to provide control signals that disable the individual transfer devices 201–204. This disabled-mode corresponds to controlling both switches S1, S2 to an open state. Switch S1 is opened, as in the conventional switching converter, after transferring energy to the storage devices L 230, C 140. Preferably, switch S2 is closed when switch S1 is opened, as in the conventional switching converter, thereby allowing the continued transfer of energy from the first storage device L 230 to the second storage device C 140. To enter the disabled state, S2 is opened when the current through the inductor L 230 decreases to zero, thereby terminating any further energy transfer between the storage devices L 230 and C 140. Both S1 and S2 remain open until an additional transfer of energy is required from the input supply 101. Note that by opening the switch S2 when the current flow through the inductor L 230 is zero, the energy that has been transferred to the storage devices L 230 from the input supply is wholly contained in the capacitor C 140 as a peak voltage potential. Note that although the resultant voltage $V_{OUT}$ 103 on the capacitor C 140 may exceed the nominal desired controlled voltage value, most system components are robust with respect to a higher-than-nominal voltage supply, particularly while in a minimum-current sleep-mode.

Depending upon the energy requirements of the load while in a minimum-current mode, relative to the amount of energy stored in the capacitor C 140, switches S1 and S2 may remain open for a substantial time duration. While in this disabled-mode, no current is being drawn from the input supply 101, no switching losses are being incurred, and no resistance losses are being incurred by a current flow through the inductor L 230. Thus, by providing a disabled-mode operation, a system comprising just one transfer device and storage device 201 can provide efficient energy transfer for minimal-current sleep-mode device loads. That is, the switching converter 201 is operated in a continuous mode during high-current demand periods, and in a discontinuous mode during low-current demand periods.

Note, however, that a single transfer device and storage device embodiment will still exhibit the high losses associated with high-current switching converters whenever energy must be transferred from the input supply to replenish the energy utilized by the load while in sleep-mode, primarily because the single storage device L 230 must be sufficiently large to support the entire high-current load demands, with a resultant less efficient inductance-to-resistance ratio compared to an inductor that could be used to support this low-current demand.

A second aspect of this invention is the distribution of disable-able transfer devices and storage devices, illustrated by the multiple devices 201–204 of FIG. 2. By providing multiple storage devices (L 230 in each of the devices 201–204), each storage device can be smaller than that required for a single storage device embodiment. That is, in a high-current load demand situation, all of the devices 201–204 are enabled, and the storage device C 140 receives an accumulation of charge from each L 230. If the load demand decreases, individual transfer and storage devices 201, 202, 203, 204 can be placed in the disabled-mode, thereby eliminating the switching and current-induced losses of each disabled device from the required energy transfer from the input supply 101. In a preferred embodiment, the storage devices L 230 of one of the devices 201–204 is minimally sized, and this particular device is the last device 201–204 to be placed in a disabled-mode, if required. If the load device draws a not-insignificant amount of energy while in the sleep-mode, the minimally sized storage device L 230 is sized to allow for the transfer of this energy from the input supply. That is, in a preferred embodiment, only one transfer and storage device is required to supply the minimum-current demands, and this device is sized as small as possible to minimize current-induced losses. In like manner, if the load device has multiple current-demanding modes, the devices 201–204 are each designed such that the incremental enabling of an additional device 201–204 provides the next increment of required current. In a general-purpose embodiment of this invention, the storage devices L 230 may be sized using powers of two (1×, 2×, 4×, 8×, etc.), thereby allowing for a selection of N devices 201–204 for up to $2^N-1$ combinations of current load demands, all but the full combination providing potentially less loss than a single device converter embodiment. Also, by distributing the storage elements, the number of options available for packaging the switching converter 200 increases, thereby allowing for potentially smaller and/or lighter weight solutions.

Figure 3:
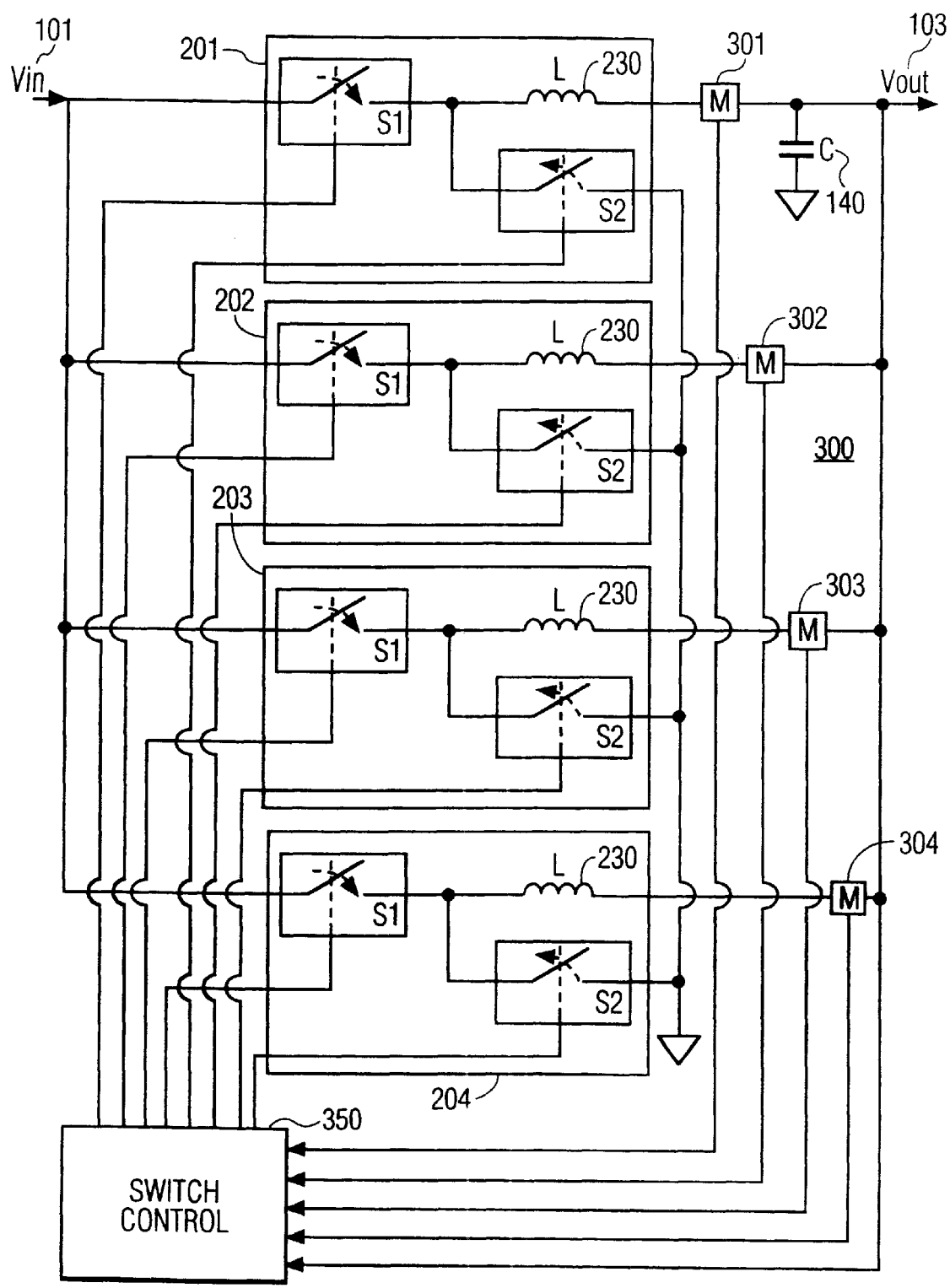
FIG. 3 illustrates an example block diagram of a switching converter with distributed transfer devices and storage devices and phase monitoring devices in accordance with this invention.

The example embodiment of FIG. 2 relies upon the switch controller 250 to determine the time to turn each switch S1, S2 on and off. As noted above, S2 is preferably turned off when the current flow through the inductor L 230 is zero. This time is determinable, in the ideal case, by the values of the elements L 230 and C 140, and knowledge of the initial conditions of the circuit. The actual component values and other factors may result in losses due to differences relative to the ideal conditions. To provide a means for determining the appropriate switching times that is substantially independent of component variations, FIG. 3 illustrates an example block diagram of an alternative switching converter 300 that contains phase monitoring devices M 301–304 in accordance with this invention. The devices M 301–304 are intended to provide an indication of zero current flowing from each inductor L 230, and may be embodied in a variety of forms common in the art. In an example embodiment, the device M 301–304 is a zero-crossing detector that provides a signal to the switch control 350 whenever the current through the device M 301–304 transitions from positive to negative, or negative to positive, or both. In another example embodiment, the device M 301–304 provides a binary (0/1) representation of the sense (−/+) of the current flow through the device M 301–304, and the switch controller 350 detects each transition. The zero-current signaling is used to open the switch S2 to disable the corresponding transfer and storage device 201–204 with minimal energy loss. Other techniques for improving the performance of the distributed devices 201–204 may also be implemented. For example, the controller 350 may use a measurement of the current in each device 201–204 to adjust the switching of switch S1 to appropriately balance the currents provided by each device 201–204, consistent with the size of each storage device L 230.

In a preferred embodiment, the controller 350 is notified of the minimal-current sleep-mode by the system that places the other components of the system into sleep-mode. In lieu of, or in addition to, such a notification, the controlled output signal $V_{OUT}$ 103, or another signal that is indicative of the controlled output 103, 103', is provided to the switch controller 350. As noted above, when a component enters the sleep-mode, the sudden change of load demand will typically introduce an overvoltage condition, wherein the controlled output 103, 103' exceeds its nominal control value because the switch controller continues, at least momentarily, to attempt to supply the former higher load current.

In accordance with another aspect of this invention, the controller 350 is configured to control the timing, or phase, at which each switch S1 is closed, particularly in a high-current mode of operation. That is, in a high-current demand situation, wherein multiple devices 201–204 are enabled, the controller 350 turns each of the switches S1 on at a different time, such that one device may be supplying current (its S1 is on) while another is not (its S1 is off). The total amount of current being provided to the storage device C 140 is the algebraic sum of the currents. As is evident to one of ordinary skill in the art, by staggering the S1-on times, the frequency of the ripple sawtooth will increase, but the magnitude of this ripple will be smaller.

Figure 4:
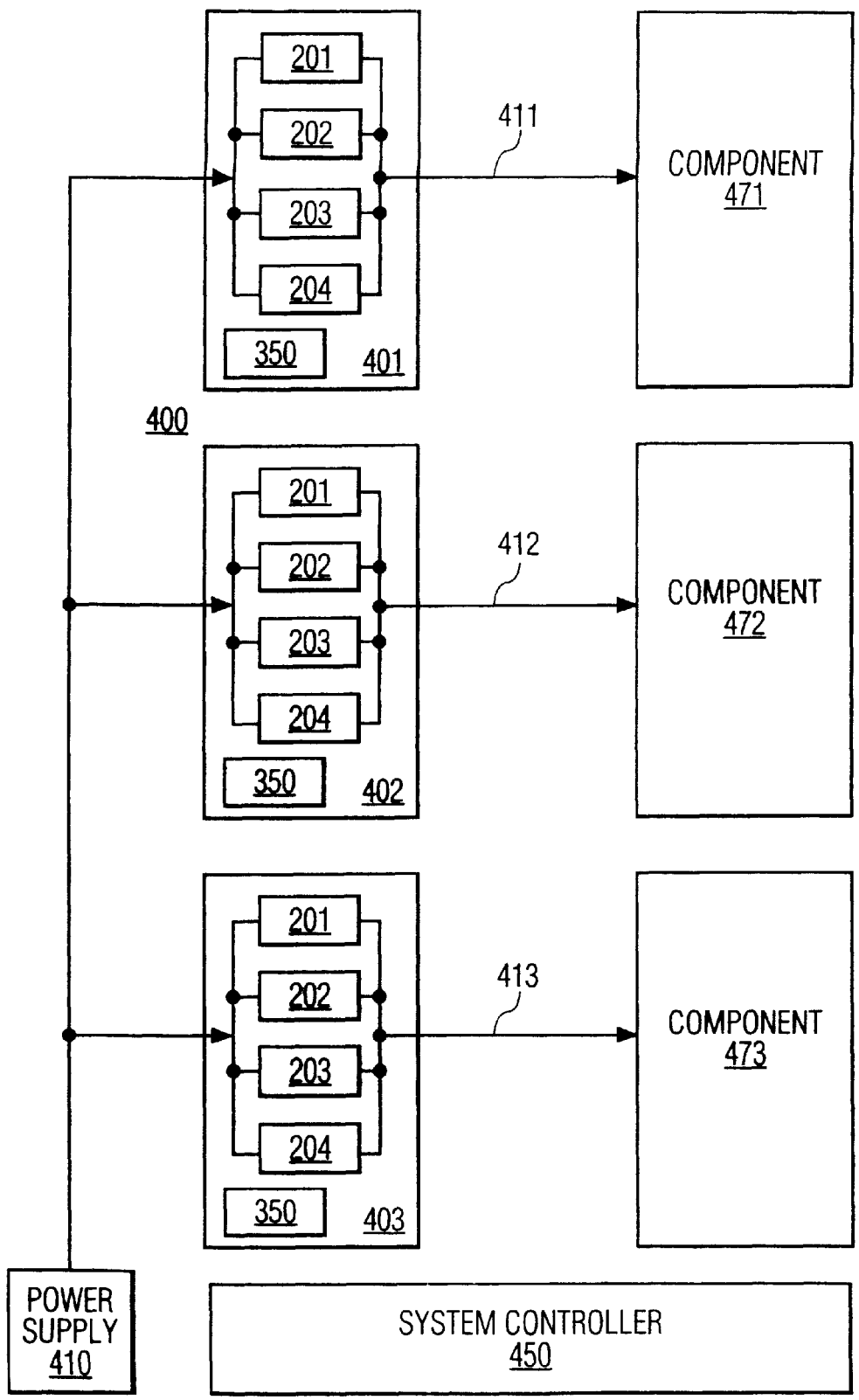
FIG. 4 illustrates an example block diagram of a system comprising a plurality of switching converters in accordance with this invention.

For completeness, FIG. 4 illustrates an example block diagram of a system 400 comprising a plurality of switching converters 401–403 in accordance with this invention. Each of the switching converters 401–403 receives power from a power supply 410 and provides a controlled output 411–413 to a corresponding system component 471–473. The system 400 is illustrated as having a system controller 450 that is structured to selectively place each of the system components 471–473 into a sleep mode. When the current demand of each system component 471–473 changes significantly, such as when placed into or out of a sleep-mode, the corresponding switching converter 401–403 selectively disables or enables one or more of its distributed transfer and storage devices 201–204 to efficiently provide the new demand. In this manner, the overall energy consumption of the system 400 is optimized for the demand imposed by each of its components 471–473.

The foregoing merely illustrates the principles of the invention. It will thus be appreciated that those skilled in the art will be able to devise various arrangements which, although not explicitly described or shown herein, embody the principles of the invention and are thus within its spirit and scope. For example, the other storage device C 140 could also be distributed among the multiple transfer and storage devices, using smaller capacity capacitors in each device. In like manner, alternative switching means can be employed to disable selective transfer and storage devices. For example, some conventional buck controllers utilize a diode in lieu of switch S2. The diode is oriented to allow a positive current flow $I_L$ 131 through the inductor L 130, but to block a reverse current flow. Utilizing a diode buck regulator for each of the transfer devices 201–204 obviates the need for the switch S2 in an embodiment of this invention, but the efficiency of a diode, particularly in a low-current operation, is substantially less than that of a controlled switch. Other switching converter embodiments may require alternative switching arrangements to effect the preferred storage of energy as a voltage potential in accordance with this invention. In like manner, a non-linear sizing of the combination of storage devices L 230 allows for a wide current-demand range, while allowing for relatively precise tuning via an appropriate selection of the smaller sized storage devices L 230. These and other system configuration and optimization features will be evident to one of ordinary skill in the art in view of this disclosure, and are included within the scope of the following claims.

We claim:

1. A power converter for providing a controlled output from an input supply, the converter comprising:
   a plurality of transfer devices that are configured to facilitate a transfer of energy from the input supply to the controlled output, and
   a controller, operably coupled to the plurality of transfer devices, which comprises means for selectively enabling and disabling one or more transfer devices of the plurality of transfer devices as a function of an energy demand of a load that is associated with the controlled output.

2. The power converter of claim 1, wherein
   the controller is configured:
      to enable the one or more transfer devices by operating the one or more transfer devices in a continuous mode, and
      to disable the one or more transfer devices by operating the one or more transfer devices in a discontinuous mode, in dependence upon the energy demand of the load that is associated with the controlled output.

3. The power converter of claim 1, wherein
   each transfer device of the plurality of transfer devices includes:
      a storage device, and
      a first control input that facilitates a transfer of energy from the input supply to the storage device for a subsequent transfer to the load that is associated with the controlled output, and
   the controller is configured to enable each transfer device by selectively asserting each first control input of each transfer device in dependence upon the demand of the load.

4. The power converter of claim 3, wherein
   each transfer device of the plurality of transfer devices further includes
      a second control input that facilitates a transfer of energy from the storage device to the controlled output, and
   the controller is further configured to enable each transfer device by selectively asserting each second control input of the plurality of transfer devices in dependence upon the demand of the load.

5. The power converter of claim 4, wherein
   the controller inhibits the assertion of the second control input of at least one transfer device in dependence upon a null-current indication that is associated with the storage device.

6. The power converter of claim 4, wherein
   when the demand of the load is substantially reduced,
      the controller is configured to disable at least one transfer device of the plurality of transfer devices by inhibiting the assertion of the first and the second control inputs.

7. The power converter of claim 3, wherein
   the controller asserts each first control input of the plurality of transfer devices at a select phase of a plurality of phases.

8. The power converter of claim 3, wherein
   the controller asserts each first control input for a time duration that is dependent upon the demand of the load that is associated with the controlled output.

9. The power converter of claim 3, further including
   an other storage device that is coupled to the controlled output and receives the transfer of energy from the storage device of each of the plurality of transfer devices, and
   wherein
   the storage device and the other storage device include at least one of: an inductor and a capacitor.

10. The power converter of claim 3, wherein
    the storage device of each of the plurality of transfer devices includes an inductor device having an inductance value,
    wherein
    a composite of the inductance values of the plurality of transfer devices is dependent upon a maximum value of the demand of the load.

11. The power converter of claim 10, wherein
    the inductance value of the inductor device of at least one of the plurality of transfer devices is further dependent upon a minimum value of the demand of the load.

12. A power converter for providing a controlled output from an input supply, the converter comprising:
    a transfer device comprising:
       a first storage device that is configured to receive energy from the input supply in dependence upon a first control signal,
       a second storage device that is configured to receive energy from the first storage device in dependence upon a second control signal, and
    a controller comprising means for asserting the first control signal and the second signal as a function of a load demand that is associated with the controlled output,
    wherein, under a minimal load condition, the controller inhibits the receipt of energy by both the first storage device and the second storage device.

13. The power converter of claim 12,
    wherein the controller:
       inhibits the assertion of the first control signal of the transfer device in dependence upon an overvoltage indication, and, inhibits the assertion of the second control signal of the transfer device in dependence upon a null-current indication.

14. The power converter of claim 12, wherein the controller asserts the first control input for a time duration that is dependent upon the load that is associated with the controlled output.

15. A system comprising:

a plurality of components, a power supply that supplies a source of energy, a plurality of power converters, each power converter of the plurality of power converters operably coupled to the power supply and a corresponding component of the plurality of components to provide a controlled output from the source of energy to each corresponding component, wherein at least one power converter of the plurality of power converters comprises:

a plurality of transfer devices that couple the source of energy to the controlled output, and a controller comprising means for selectively enabling and disabling at least one transfer device of the plurality of transfer devices as a function of a load demand of the component that receives the controlled output from the at least one power converter.

16. The system of claim 15, wherein the controller of the at least one power converter selectively enables each transfer device of the plurality of transfer devices to couple the source of energy at a corresponding phase of a plurality of phases.

17. A controller for enabling the control of a plurality of transfer devices, the plurality of transfer devices having a common input supply and a common controlled output, the controller comprising:

a plurality of switch controllers, each switch controller providing a switch control signal to a corresponding transfer device of the plurality of transfer devices to facilitate a coupling of the common input supply to the common controlled output via the corresponding transfer device, and a phase controller that controls each switch controller so as to provide each switch control signal at a select phase of a plurality of phases as a function of a load demand on said common controlled output.

18. The controller of claim 17, wherein each switch controller provides the switch control signal in dependence upon a load that is associated with the common controlled output.

19. The controller of claim 17, wherein each switch controller is configured to provide the switch control signal for each transfer device in dependence upon a current flow within each transfer device.

* * * * *